US011566127B2

(12) United States Patent
Zhang et al.

(10) Patent No.: US 11,566,127 B2
(45) Date of Patent: Jan. 31, 2023

(54) RESIN COMPOSITION AND ARTICLE MADE THEREFROM

(71) Applicant: Elite Material Co., Ltd., Taoyuan (TW)

(72) Inventors: Yan Zhang, Kunshan (CN); Jue Tan, Kunshan (CN); Rongtao Wang, Kunshan (CN)

(73) Assignee: Elite Material Co., Ltd., Taoyuan (TW)

(*) Notice: Subject to any disclaimer, the term of this patent is extended or adjusted under 35 U.S.C. 154(b) by 240 days.

(21) Appl. No.: 16/716,977

(22) Filed: Dec. 17, 2019

(65) Prior Publication Data

US 2021/0139691 A1    May 13, 2021

(30) Foreign Application Priority Data

Nov. 13, 2019  (CN) .......................... 201911107378.0

(51) Int. Cl.
| | | |
|---|---|---|
| *C08L 53/00* | (2006.01) | |
| *C08F 293/00* | (2006.01) | |
| *C08F 299/02* | (2006.01) | |
| *C08K 5/3435* | (2006.01) | |
| *C08K 5/50* | (2006.01) | |

(Continued)

(52) U.S. Cl.
CPC ................ *C08L 53/00* (2013.01); *B32B 5/02* (2013.01); *B32B 15/14* (2013.01); *B32B 15/20* (2013.01); *C08F 293/00* (2013.01); *C08F 299/022* (2013.01); *C08F 299/024* (2013.01); *C08J 5/244* (2021.05); *C08J 5/246* (2021.05); *C08K 5/3415* (2013.01); *C08K 5/3435* (2013.01); *C08K 5/50* (2013.01); *C08L 71/12* (2013.01); *B32B 2262/101* (2013.01); *C08J 2353/00* (2013.01)

(58) Field of Classification Search
CPC ......... C08L 71/12; C08L 71/126; C08K 5/32; C08K 5/3435; C09D 171/12; C09J 171/12

See application file for complete search history.

(56) References Cited

U.S. PATENT DOCUMENTS

| | | | | |
|---|---|---|---|---|
| 2017/0190837 A1* | 7/2017 | Hsieh | ......................... | C08J 5/10 |
| 2019/0292326 A1* | 9/2019 | Chang | ....................... | C08F 2/40 |

FOREIGN PATENT DOCUMENTS

| | | | | |
|---|---|---|---|---|
| JP | 2010111758 A | * | 5/2010 | |
| WO | WO-2021060181 A1 | * | 4/2021 | ............... B32B 5/00 |

OTHER PUBLICATIONS

Partial machine translation of WO-2021060181-A1 (2021).*
Partial machine translation of JP-2010111758-A (2010).*

* cited by examiner

*Primary Examiner* — Kregg T Brooks
(74) *Attorney, Agent, or Firm* — Muncy, Geissler, Olds & Lowe, P.C.

(57) ABSTRACT

A resin composition includes: a vinyl-containing polyphenylene ether resin; a compound of Formula (1); and a compound of Formula (2), a compound of Formula (3), a compound of Formula (4) or a combination thereof. The resin composition may be used to make various articles, such as a prepreg, a resin film, a laminate or a printed circuit board, and at least one of the following improvements can be achieved, including prepreg viscosity variation ratio, prepreg stickiness resistance, amount of void after lamination, multi-layer board thermal resistance, glass transition temperature, ratio of thermal expansion, copper foil peeling strength, dissipation factor and laminate appearance.

18 Claims, 1 Drawing Sheet

(51) Int. Cl.
B32B 15/20 (2006.01)
B32B 5/02 (2006.01)
B32B 15/14 (2006.01)
C08K 5/3415 (2006.01)
C08J 5/24 (2006.01)
C08L 71/12 (2006.01)

RESIN COMPOSITION AND ARTICLE MADE THEREFROM

CROSS-REFERENCE TO RELATED APPLICATION

This application claims the priority benefits of China Patent Application No. 201911107378.0, filed on Nov. 13, 2019, the entirety of which is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

With the rapid advancement of electronic technology, information processing in mobile communication, servers, cloud storage and other electronic products has been incessantly directed toward high frequency signal transmission and high speed digitalization, and low dielectric resin material has become the mainstream for the development of laminates for high frequency and high speed data transmission in order to satisfy the demands of high speed information transmission. The major requirements of resin materials such as copper-clad laminates include several aspects such as low dissipation factor (Df), high reliability, high thermal resistance and high dimensional stability. Therefore, there is a need for developing materials suitable for a printed circuit board (PCB) with overall better performances.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

In order to achieve the aforesaid object and other objects, the present disclosure provides a resin composition, comprising: a vinyl-containing polyphenylene ether resin; a compound of Formula (1); and a compound of Formula (2), a compound of Formula (3), a compound of Formula (4) or a combination thereof; wherein a ratio of part by weight of the compound of Formula (2), the compound of Formula (3), the compound of Formula (4) or a combination thereof to the compound of Formula (1) is between $8.33 \times 10^{-5}$ and $8.33 \times 10^{-2}$;

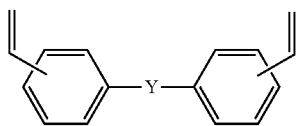

Formula (1)

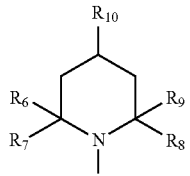

Formula (2)

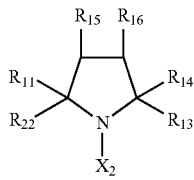

Formula (3)

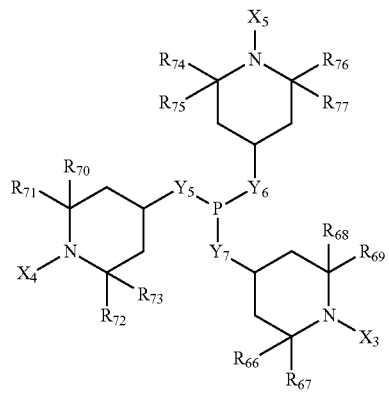

Formula (4)

wherein:
in Formula (1), Y is any one of Formula (1-1), Formula (1-2) and Formula (1-3) or a combination thereof:

$$-(CH_2)_{n1}-$$

Formula (1-1)

Formula (1-2)

Formula (1-3)

$$-((CH_2)_{n6}-O-(CH_2)_{n6})_{n7}-$$

wherein n1 represents an integer of 0 to 30 (e.g., 0, 2, 5, 10, 15, 20, 25, or 30), n2 represents an integer of 0 to 6 (e.g., 1, 2, 3, 4, 5 or 6), and n3, n4, n5, n6 and n7 each individually represent an integer of 1 to 6 (such as all represent 1);
in Formula (2), $X_1$ is an oxygen radical or a hydroxyl group, $R_6$ to $R_9$ each independently represent a hydrogen atom or a $C_1$-$C_5$ alkyl group, $R_6$ to $R_9$ are not a hydrogen atom at the same time, and $R_{10}$ is a hydrogen atom, a methyl group, an amino group, a hydroxyl group, a carbonyl group or a carboxyl group;
in Formula (3), $X_2$ is an oxygen radical or a hydroxyl group, $R_1$ to $R_{14}$ each independently represent a hydrogen atom or a $C_1$-$C_5$ alkyl group, $R_1$ to $R_{14}$ are not a hydrogen atom at the same time, and $R_{15}$ and $R_{16}$ each independently represent a hydrogen atom, a methyl group, an amino group, a hydroxyl group, a carbonyl group or a carboxyl group or $R_{15}$ and $R_{16}$ together define a benzene ring structure; and in Formula (4), $Y_5$, $Y_6$ and $Y_7$ each independently represent a methylene group, an ether group, a secondary amino group, a carbonyl group or a phenylene group, $X_3$, $X_4$ and $X_5$ each independently represent an oxygen radical or a hydroxyl group, $R_{66}$ to $R_{77}$ each independently represent a hydrogen atom or a $C_1$-$C_5$ alkyl group, and $R_{66}$ to $R_{77}$ are not a hydrogen atom at the same time.

For example, in one embodiment, the resin composition comprises: 100 parts by weight of the vinyl-containing polyphenylene ether resin; 12 to 100 parts by weight of the compound of Formula (1); and 0.005 to 4 parts by weight of the compound of Formula (2), the compound of Formula (3), the compound of Formula (4) or a combination thereof.

For example, in one embodiment, the resin composition comprises: 100 parts by weight of the vinyl-containing polyphenylene ether resin; 12 to 100 parts by weight of the compound of Formula (1); and 0.01 to 4 parts by weight of the compound of Formula (2), the compound of Formula (3), the compound of Formula (4) or a combination thereof.

For example, in one embodiment, the resin composition comprises: 100 parts by weight of the vinyl-containing polyphenylene ether resin; 20 to 90 parts by weight of the compound of Formula (1); and 0.01 to 4 parts by weight of the compound of Formula (2), the compound of Formula (3), the compound of Formula (4) or a combination thereof.

For example, in one embodiment, the ratio of part by weight of the compound of Formula (2), the compound of Formula (3), the compound of Formula (4) or a combination thereof to the compound of Formula (1) is between $1.67*10^{-4}$ and $8.33*10^{-2}$.

In one embodiment, the vinyl-containing polyphenylene ether resin comprises a vinylbenzyl-containing polyphenylene ether resin, a methacrylate-containing polyphenylene ether resin, an allyl-containing polyphenylene ether resin, a vinylbenzyl-modified bisphenol A polyphenylene ether resin, a chain-extended vinyl-containing polyphenylene ether resin or a combination thereof.

Unless otherwise specified, the aforesaid vinyl-containing polyphenylene ether resin is construed as including its modification. Examples of the modification described above may comprise, but not limited to, a product derived from a vinyl-containing polyphenylene ether resin with its reactive functional group modified, a product derived from a prepolymerization reaction of a vinyl-containing polyphenylene ether resin and other resins, a product derived from a crosslinking reaction of a vinyl-containing polyphenylene ether resin and other resins, a product derived from homopolymerizing a vinyl-containing polyphenylene ether resin, a product derived from copolymerizing a vinyl-containing polyphenylene ether resin and another different vinyl-containing polyphenylene ether resin, etc.

In one embodiment, the compound of Formula (1) may be for example a compound with two vinylphenyl groups, such as a bis(vinylphenyl) compound. For example, the compound of Formula (1) may comprise various structural isomers of a bis(vinylphenyl) compound, wherein the relative position of the two vinyl groups on the benzene rings is not limited, as illustrated by Formula (1). For example, in one embodiment, the compound of Formula (1) contains between 80% and 99% of para-para vinyl groups. In addition, in one embodiment, the compound of Formula (1) is primarily present as a monomer, such as having a monomer content of between 80% and 100%.

In one embodiment, the compound of Formula (1) comprises a bis(vinylphenyl) compound, such as bis(vinylphenyl) ethane, bis(vinylphenyl) dimethylbenzene, bis(vinylphenyl) dimethyl ether, bis(vinylphenyl) diethylbenzene or a combination thereof, but not limited thereto. Preferably, the compound of Formula (1) comprises bis(vinylphenyl) ethane (BVPE).

For example, the bis(vinylphenyl) ethane may comprise any one or more isomers, such as but not limited to p,p-divinyl-1,2-diphenylethane (p,p-BVPE, as shown in Formula (1-4)), m,p-divinyl-1,2-diphenylethane (m,p-BVPE, as shown in Formula (1-5)) and m,m-divinyl-1,2-diphenylethane (m,m-BVPE, as shown in Formula (1-6)). As used herein, p represents para-position and m represents meta-position.

In one embodiment, the bis(vinylphenyl) compound contains between 80% and 99% of para-para vinyl groups. In other words, in 80% to 99% of the bis(vinylphenyl) compound, the vinyl groups on the vinylphenyl groups are both at the para-position of the benzene rings relative to the Y group bonded with the vinylphenyl groups.

In one embodiment, the compound of Formula (1) comprises a compound of any one of Formula (1-4) to Formula (1-6) or a combination thereof:

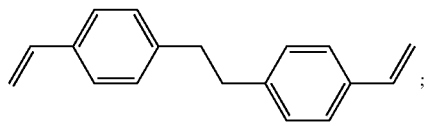

Formula (1-4)

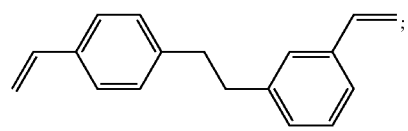

Formula (1-5)

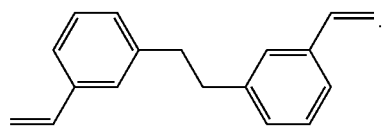

Formula (1-6)

Unless otherwise specified, the compound of Formula (1) may also be modified. In other words, the compound of Formula (1) is construed to encompass its modification, including but not limited to its prepolymer, copolymer, homopolymer, derivative or a combination thereof. For example, if the compound of Formula (1) is a bis(vinylphenyl) compound, then the compound of Formula (1) is construed to comprise a bis(vinylphenyl) compound and/or a modification of a bis(vinylphenyl) compound. As used herein, the modification of a bis(vinylphenyl) compound is construed to comprise various modifications derived from a bis(vinylphenyl) compound (e.g., p,p-divinyl-1,2-diphenylethane, m,m-divinyl-1,2-diphenylethane or a combination thereof), including but not limited to a bis(vinylphenyl) compound prepolymer, a bis(vinylphenyl) compound copolymer, a bis(vinylphenyl) compound homopolymer, a bis(vinylphenyl) compound derivative or a combination thereof.

For example, the compound of Formula (1) is construed to encompass, but not limited to, a prepolymer, a copolymer, or a derivative of a bis(vinylphenyl) compound and the following component: (meth)acrylate or methyl (meth)acrylate (e.g., methyl methacrylate or acrylate), styrene, t-butyl styrene, divinylbenzene, ethylstyrene, triallyl isocyanurate, triallyl cyanurate, 1,2,4-trivinyl cyclohexane, polyphenylene ether, cyanate ester, polybutadiene, active ester, maleimide resin or a combination thereof.

For example, if the compound of Formula (1) is a bis(vinylphenyl) compound, then the prepolymer of bis(vinylphenyl) compound may be but not limited to a prepolymer of the bis(vinylphenyl) compound and at least one another compound, such as but not limited to a prepolymer of the bis(vinylphenyl) compound, a methyl methacrylate resin and a triallyl isocyanurate resin, wherein at least one of the bis(vinylphenyl) compound, the methyl methacrylate resin and the triallyl isocyanurate resin has a crosslinking conversion rate of less than 100%. For example, the copolymer of a bis(vinylphenyl) compound may be such as but not limited to a copolymer of a bis(vinylphenyl) compound and at least one another compound, such as but not limited to a copolymer of a bis(vinylphenyl) compound and ethylstyrene. For example, the homopolymer of a bis(vinylphenyl) compound may be such as but not limited to a polymer of a bis(vinylphenyl) compound and a bis(vinylphenyl) compound. For example, the derivative of a bis(vinylphenyl) compound may be such as but not limited to a derivative formed by a bis(vinylphenyl) compound with a hydrogen atom of its terminal vinyl groups substituted by another atom or group.

In one embodiment, the compound of Formula (2) comprises a compound of any one of Formula (5) to Formula (9) or a combination thereof:

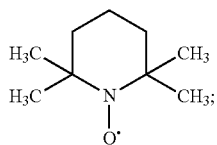

Formula (5)

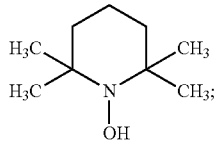

Formula (6)

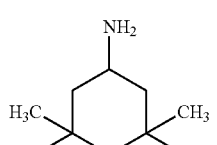

Formula (7)

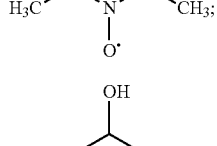

Formula (8)

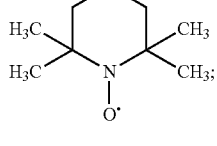

Formula (9)

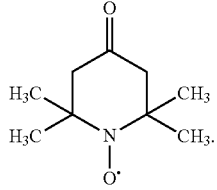

In one embodiment, the compound of Formula (3) comprises a compound of any one of Formula (10) to Formula (13) or a combination thereof:

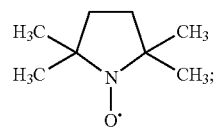

Formula (10)

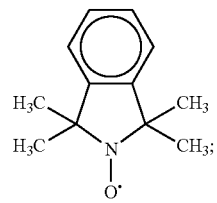

Formula (11)

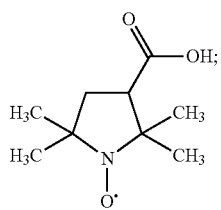

Formula (12)

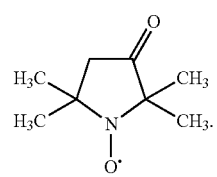

Formula (13)

In one embodiment, the compound of Formula (4) comprises a compound of any one of Formula (14) to Formula (16) or a combination thereof:

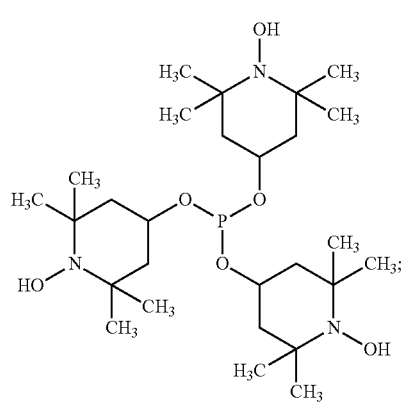

Formula (14)

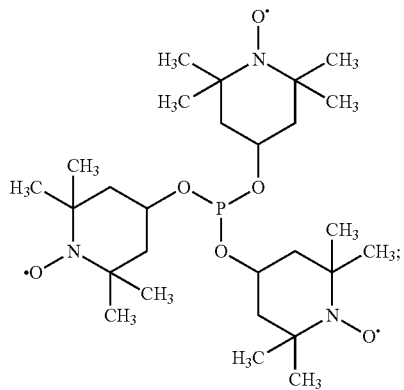

Formula (15)

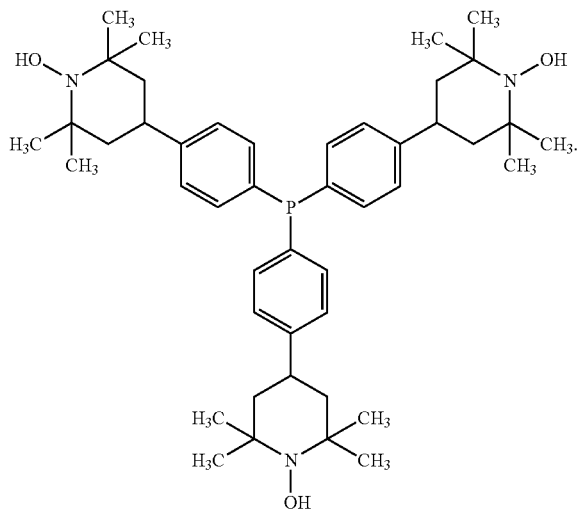

Formula (16)

In addition, in one embodiment, the resin composition may further optionally comprise: an epoxy resin, a cyanate ester resin, a maleimide resin, a small molecule vinyl compound, an acrylate, a phenolic resin, a benzoxazine resin, a styrene maleic anhydride, a polyolefin, a polyester resin, an amine curing agent, a polyamide resin, a polyimide resin or a combination thereof.

In addition, in one embodiment, the resin composition may further optionally comprise: flame retardant, inorganic filler, curing accelerator, solvent, silane coupling agent, coloring agent, toughening agent or a combination thereof.

Another main object of the present disclosure is to provide an article made from the aforesaid resin composition, comprising a prepreg, a resin film, a laminate or a printed circuit board.

In one embodiment, articles made from the resin composition disclosed herein have one, more or all of the following properties:
  a prepreg viscosity variation ratio of less than or equal to 10%;
  absence of stickiness between two adjacent prepreg surfaces;
  absence of void after lamination;
  no delamination after subjecting the article to a multi-layer board thermal resistance test by reference to IPC-TM-650 2.4.13.1;
  a glass transition temperature as measured by reference to IPC-TM-650 2.4.24.4 of greater than or equal to 210° C.;
  a ratio of thermal expansion as measured by reference to IPC-TM-650 2.4.24.5 of less than or equal to 2.5%;
  a copper foil peeling strength as measured by reference to IPC-TM-650 2.4.8 of greater than or equal to 3.1 lb/in;
  a dissipation factor as measured by reference to JIS C2565 at 10 GHz of less than or equal to 0.0020; and
  passing a visual inspection test of laminate appearance, such as no dry board or uneven thickness observed from laminate appearance.

DESCRIPTION OF THE EMBODIMENTS

Figure 1:
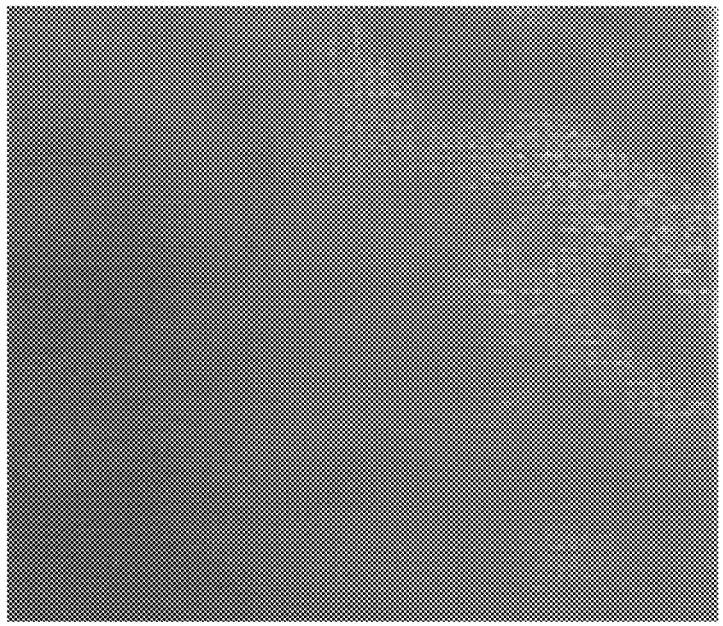
FIG. 1 illustrates a laminate with dry board.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

As used herein, part(s) by weight represents weight part(s) and may have any weight unit, such as but not limited to kilogram, gram, pound, etc. For example, 100 parts by weight of a vinyl-containing polyphenylene ether resin may represent 100 kilograms of a vinyl-containing polyphenylene ether resin or 100 pounds of a vinyl-containing polyphenylene ether resin.

The following embodiments and examples are illustrative in nature and are not intended to limit the present disclosure and its application. In addition, the present disclosure is not bound by any theory described in the background and summary above or the following embodiments or examples.

As described above, the present disclosure primarily aims to provide a resin composition, comprising: a vinyl-containing polyphenylene ether resin; a compound of Formula (1); and a compound of Formula (2), a compound of Formula (3), a compound of Formula (4) or a combination thereof; wherein a ratio of part by weight of the compound of Formula (2), the compound of Formula (3), the compound of Formula (4) or a combination thereof to the compound of Formula (1) is between $8.33*10^{-5}$ and $8.33*10^{-2}$;

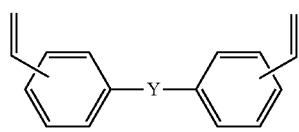

Formula (1)

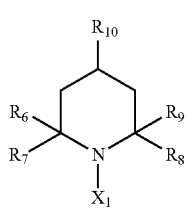

Formula (2)

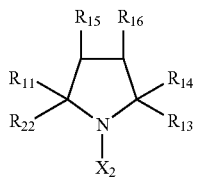

Formula (3)

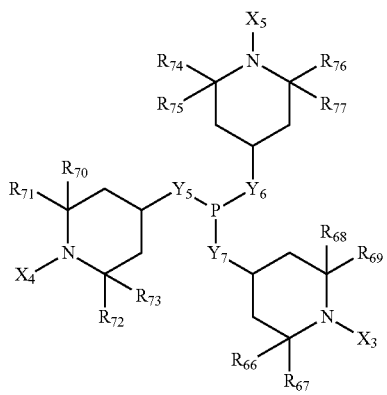

Formula (4)

wherein:
in Formula (1), Y is any one of Formula (1-1), Formula (1-2) and Formula (1-3) or a combination thereof:

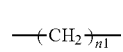

Formula (1-1)

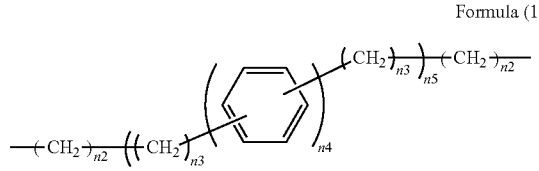

Formula (1-2)

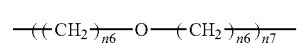

Formula (1-3)

wherein n1 represents an integer of 0 to 30 (e.g., 0, 2, 5, 10, 15, 20, 25, or 30), n2 represents an integer of 0 to 6 (e.g., 1, 2, 3, 4, 5 or 6), and n3, n4, n5, n6 and n7 each individually represent an integer of 1 to 6 (such as all represent 1);
in Formula (2), $X_1$ is an oxygen radical or a hydroxyl group, $R_6$ to $R_9$ each independently represent a hydrogen atom or a $C_1$-$C_5$ alkyl group, $R_6$ to $R_9$ are not a hydrogen atom at the same time, and $R_{10}$ is a hydrogen atom, a methyl group, an amino group, a hydroxyl group, a carbonyl group or a carboxyl group;
in Formula (3), $X_2$ is an oxygen radical or a hydroxyl group, $R_{11}$ to $R_{14}$ each independently represent a hydrogen atom or a $C_1$-$C_5$ alkyl group, $R_{11}$ to $R_{14}$ are not a hydrogen atom at the same time, and $R_{15}$ and $R_{16}$ each independently represent a hydrogen atom, a methyl group, an amino group, a hydroxyl group, a carbonyl group or a carboxyl group or $R_{15}$ and $R_{16}$ together define a benzene ring structure; and
in Formula (4), $Y_5$, $Y_6$ and $Y_7$ each independently represent a methylene group, an ether group, a secondary amino group, a carbonyl group or a phenylene group, $X_3$, $X_4$ and $X_5$ each independently represent an oxygen radical or a hydroxyl group, $R_{66}$ to $R_{77}$ each independently represent a hydrogen atom or a $C_1$-$C_5$ alkyl group, and $R_{66}$ to $R_{77}$ are not a hydrogen atom at the same time.

As used herein, "vinyl-containing" refers to the presence of an ethylenic carbon-carbon double bond (C═C) or a functional group derived therefrom in a compound. Therefore, examples of "vinyl-containing" may include, but not limited to, a structure containing a vinyl group, an allyl group, a vinylbenzyl group, a methacrylate or the like. Unless otherwise specified, the position of the aforesaid functional group is not particularly limited and may be located at the terminal of a long-chain structure. In other words, the vinyl-containing polyphenylene ether resin described herein represents a polyphenylene ether resin containing a vinyl group, examples including but not limited to a polyphenylene ether resin containing a vinyl group, an allyl group, a vinylbenzyl group, a methacrylate group or the like.

In one embodiment, the vinyl-containing polyphenylene ether resin comprises a vinylbenzyl-containing polyphenylene ether resin, a methacrylate-containing polyphenylene ether resin, an allyl-containing polyphenylene ether resin, a vinylbenzyl-modified bisphenol A polyphenylene ether resin, a chain-extended vinyl-containing polyphenylene ether resin or a combination thereof.

For example, the vinyl-containing polyphenylene ether resin may be a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

In addition, for example, the vinyl-containing polyphenylene ether resin may comprise a structure of Formula (A):

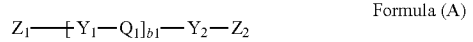

Formula (A)

wherein b1 is a natural number of 0 to 2;

$Q_1$ comprises a structure of any one of Formula (A-1) to Formula (A-3):

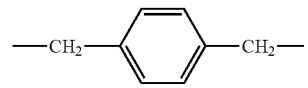

Formula (A-1)

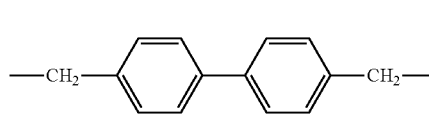

Formula (A-2)

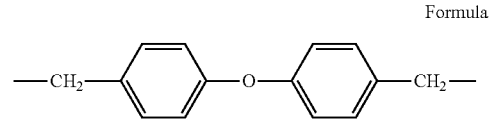

Formula (A-3)

$Y_1$ and $Y_2$ independently comprise a structure of Formula (A-4):

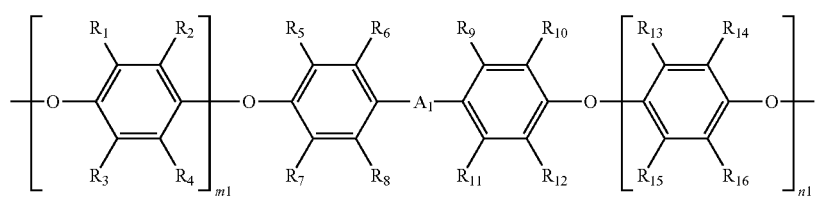

Formula (A-4)

in Formula (A-4), m1 and n1 independently represent an integer of 1 to 15, such as 1, 5, 10 or 15; $R_1$ to $R_{16}$ are independently selected from H, —$CH_3$ and a halogen atom (e.g., chlorine, bromine, or iodine); $A_1$ is selected from a covalent bond, —$CH_2$—, —$CH(CH_3)$—, —$C(CH_3)_2$—, —O—, —S—, —$SO_2$— and a carbonyl group;

$Z_1$ and $Z_2$ independently comprise a structure of Formula (A-5):

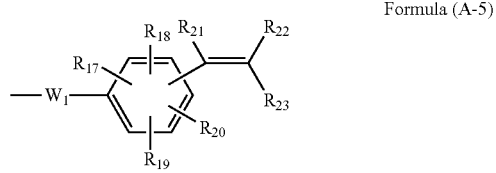

Formula (A-5)

in Formula (A-5), $R_{17}$ to $R_{23}$ are individually selected from H, —$CH_3$ or a halogen atom, and $W_1$ is a $C_1$-$C_3$ bivalent aliphatic group, such as methylene, ethylene, or propylene.

For example, the vinyl-containing polyphenylene ether resin may comprise a structure below:

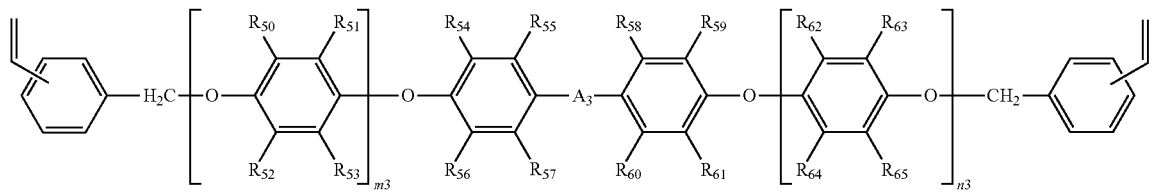

wherein $m_3$ and $n_3$ independently represent an integer of 1 to 15; $R_{50}$ to $R_{65}$ are independently selected from H, —$CH_3$ and a halogen atom; and $A_3$ is selected from a covalent bond, —$CH_2$—, —$CH(CH_3)$—, —$C(CH_3)_2$—, —O—, —S—, —$SO_2$— and a carbonyl group.

In addition, for example, the vinyl-containing polyphenylene ether resin may comprise a structure of Formula (B):

Formula (B)

wherein b2 is a natural number of 0 to 8;
Q2 comprises a structure of any one of Formula (B-1) to Formula (B-3) or a combination thereof:

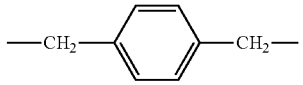

Formula (B-1)

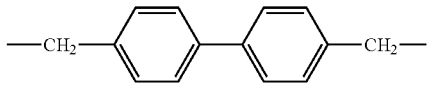

Formula (B-2)

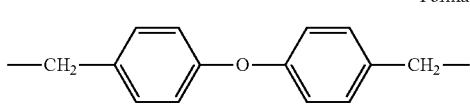

Formula (B-3)

$Y_3$ and $Y_4$ independently comprise a structure of Formula (B-4):

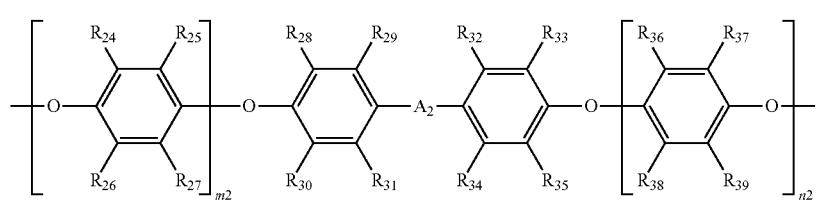

Formula (B-4)

wherein m2 and n2 independently represent an integer of 1 to 30, such as 1, 5, 10, 15, 20, 25 or 30; $R_{24}$ to $R_{39}$ are independently selected from H, —$CH_3$ and a halogen atom (e.g., chlorine, bromine, or iodine); $A_2$ is selected from a covalent bond, —$CH_2$—, —$CH(CH_3)$—, —$C(CH_3)_2$—, —O—, —S—, —$SO_2$— and a carbonyl group;

$Z_3$ and $Z_4$ independently comprise a structure of Formula (B-5), Formula (B-6) or Formula (B-7):

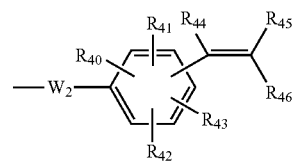

Formula (B-5)

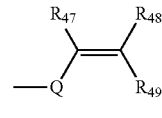

Formula (B-6)

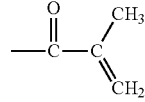

Formula (B-7)

wherein $R_{40}$ to $R_{49}$ are individually selected from H, —$CH_3$ or a halogen atom, and $W_2$ and Q are individually a $C_1$-$C_3$ bivalent aliphatic group (e.g., methylene, ethylene, or propylene).

In the resin composition of the present disclosure, the compound of Formula (2) preferably comprises a compound of any one of Formula (5) to Formula (9) or a combination thereof, but not limited thereto. Unless otherwise specified, in Formula (2), the oxygen radical at the position $X_1$ and the hydroxyl group at the position $X_1$ are chemically equivalent. For example, the structure of Formula (5) and the structure of Formula (6) are equivalent to each other; that is, the structure of Formula (5) may be present as the structure of Formula (6), and the structure of Formula (6) may be present as the structure of Formula (5).

In another aspect, in the resin composition of the present disclosure, the compound of Formula (3) preferably comprises a compound of any one of Formula (10) to Formula (13) or a combination thereof, but not limited thereto. Similarly, unless otherwise specified, in Formula (3), the oxygen radical at the position $X_2$ and the hydroxyl group at the position $X_2$ are chemically equivalent.

In another aspect, in the resin composition of the present disclosure, the compound of Formula (4) preferably comprises a compound of any one of Formula (14) to Formula (16) or a combination thereof, but not limited thereto.

Similarly, unless otherwise specified, in Formula (4), the oxygen radical at the position $X_3$, $X_4$ or $X_5$ and the hydroxyl group at the position $X_3$, $X_4$ or $X_5$ are chemically equivalent. For example, the structure of Formula (14) and the structure of Formula (15) are equivalent to each other; that is, the structure of Formula (14) may be present as the structure of Formula (15), and the structure of Formula (15) may be present as the structure of Formula (14).

In other words, as used herein, unless otherwise specified, to the compound of Formula (2), the compound of Formula (3) or the compound of Formula (4), any disclosure of embodiment or chemical structure of any one of $X_1$ to $X_5$ being an oxygen radical is considered as the disclosure of embodiment or chemical structure of any one of $X_1$ to $X_5$ being a hydroxyl group. For example, whenever the structure of Formula (5) is disclosed herein, it is construed as the disclosure of the structure of Formula (6), vice versa.

The amount of each component used in the resin composition disclosed herein is not particularly limited. For example, relative to 100 parts by weight of the vinyl-containing polyphenylene ether resin, the compound of Formula (1) (including its prepolymer, copolymer, homopolymer, derivative or a combination) may be present in an amount of 12 to 100 parts by weight (such as but not limited to 12, 20, 30, 40, 60, 80, 90 or 100 parts by weight), the compound of Formula (2) may be present in an amount of 0.005 to 4 parts by weight (such as but not limited to 0.005, 0.01, 0.015, 0.02, 0.05, 0.068, 0.076, 0.1, 0.2, 0.5, 0.8, 1, 2, 3 or 4 parts by weight), the compound of Formula (3) may be present in an amount of 0.005 to 4 parts by weight (such as but not limited to 0.005, 0.01, 0.015, 0.02, 0.05, 0.068, 0.076, 0.1, 0.2, 0.5, 0.8, 1, 2, 3 or 4 parts by weight), and the compound of Formula (4) may be present in an amount of 0.005 to 4 parts by weight (such as but not limited to 0.005, 0.01, 0.015, 0.02, 0.05, 0.068, 0.076, 0.1, 0.2, 0.5, 0.8, 1, 2, 3 or 4 parts by weight), with the proviso that the total amount of the compound of Formula (2), the compound of Formula (3) and the compound of Formula (4) is not greater than 4 parts by weight, and the resin composition may comprise any one, two, three or more of the compound of Formula (2), the compound of Formula (3) and the compound of Formula (4).

For example, in one embodiment, the ratio of part by weight of the compound of Formula (2), the compound of Formula (3), the compound of Formula (4) or a combination thereof to the compound of Formula (1) is between $1.67*10^{-4}$ and $8.33*10^{-2}$; that is, the ratio of the compound of Formula (2), the compound of Formula (3), the compound of Formula (4) or a combination thereof to the compound of Formula (1) is between 1:6000 and 1:12.

In one embodiment, the resin composition disclosed herein may further optionally comprise: an epoxy resin, a cyanate ester resin, a maleimide resin, a small molecule vinyl compound, an acrylate, a phenolic resin, a benzoxazine resin, a styrene maleic anhydride, a polyolefin, a polyester resin, an amine curing agent, a polyamide resin, a polyimide resin or a combination thereof.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, and isocyanate-modified epoxy resin. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin, wherein the phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin may include any one or more cyanate ester resins useful for preparing a prepreg, a resin film, a laminate or a printed circuit board, such as a compound having an Ar—O—C≡N structure, wherein Ar may be a substituted or unsubstituted aromatic group. Examples of the cyanate ester resin include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available under the tradename Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza.

For example, the maleimide resin may refer to a compound or a mixture containing at least one maleimide group. Unless otherwise specified, the maleimide resin used in the present disclosure is not particularly limited and may include any one or more maleimide resins useful for making a prepreg, a resin film, a laminate or a printed circuit board. Examples include but are not limited to 4,4'-diphenylmethane bismaleimide, oligomer of phenylmethane maleimide (a.k.a. polyphenylmethane maleimide), bismaleimide toluene, diethylbismaleimide toluene, m-phenylene bismaleimide, bisphenol A diphenyl ether bismaleimide, 3,3'-dimethyl-5,5'-diethyl-4,4'-diphenyl methane bismaleimide, 3,3'-dimethyl-5,5'-diethyl-4,4'-diphenyl ether bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenyl maleimide, a maleimide resin containing aliphatic long-chain structure, or a combination thereof. Preferably, the maleimide resin is a maleimide resin containing aliphatic long-chain structure. In addition, unless otherwise specified, the aforesaid maleimide resin of the present disclosure may comprise a prepolymer thereof, such as a prepolymer of diallyl compound and maleimide compound, a prepolymer of diamine and maleimide compound, a prepolymer of multi-functional amine and maleimide compound or a prepolymer of acid phenol compound and maleimide compound, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000, BMI-4000H, BMI-5000, BMI-5100, BM-7000 and BMI-7000H available from Daiwakasei Co., Ltd., products such as BMI-70 and BMI-80 available from K.I Chemical Industry Co., Ltd., or products such as Compimide MDAB, Compimide TDAB, and Compimide DE-TDAB available from Evonik Industries.

For example, the maleimide resin containing aliphatic long-chain structure may include products such as BMI-689, BMI-1400, BMI-1500, BMI-1700, BMI-2500, BMI-3000, BMI-3000J, BMI-3000G, BMI-3000GE, BMI-5000 and BMI-6000 available from Designer Molecules Inc.

For example, the small molecule vinyl compound as used herein refers to a vinyl-containing compound with a molecular weight of less than or equal to 1000, preferably between 100 and 900 and more preferably between 100 and 800. According to the present disclosure, the small molecule vinyl compound may include, but not limited to, divinylbenzene (DVB), bis(vinylbenzyl) ether (BVBE), triallyl isocyanurate (TAIC), triallyl cyanurate (TAC), 1,2,4-trivinyl cyclohexane (TVCH) or a combination thereof.

For example, the acrylate may include, but not limited to, tricyclodecane di(meth)acrylate, tri(meth)acrylate, 1,1'-[(octahydro-4,7-methano-1H-indene-5,6-diyl) bis(methylene)] ester (e.g., SR-833S, available from Sartomer) or a combination thereof.

For example, the phenolic resin may comprise but not limited to mono-functional, bifunctional or multifunctional phenolic resin, comprising phenolic resin of a resin composition conventionally used for making prepregs, such as phenoxy resin, novolac resin, etc.

For example, the benzoxazine resin includes, but not limited to, bisphenol A benzoxazine resin, bisphenol F benzoxazine resin, phenolphthalein benzoxazine resin, dicyclopentadiene benzoxazine resin, phosphorus-containing benzoxazine resin, oxydianiline benzoxazine resin, or vinyl-containing benzoxazine resin, such as but not limited to LZ-8270, LZ-8280, LZ-8290 or LZ-8298 available from Huntsman, HFB-2006M available from Showa High Polymer, or KZH-5031 available from Kolon Industries Inc.

For example, in the styrene maleic anhydride, the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope.

For example, examples of the polyolefin include but are not limited to styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene terpolymer, polybutadiene (homopolymer of butadiene), maleic anhydride-butadiene copolymer, methyl styrene copolymer or a combination thereof.

For example, the polyester resin may be prepared by esterification of dicarboxylic aromatic compounds with dihydroxyl aromatic compounds. Examples of the polyester resin include, but not limited to, HPC-8000, HPC-8150 or HPC-8200 available from D.I.C. Corporation.

For example, the amine curing agent may include, but not limited to, any one or a combination of diamino diphenyl sulfone, diamino diphenyl methane, diamino diphenyl ether, diamino diphenyl sulfide and dicyandiamide.

For example, the polyamide resin may be any polyamide resin known in the field to which this disclosure pertains, including but not limited to various commercially available polyamide resin products.

For example, the polyimide resin may be any polyimide resin known in the field to which this disclosure pertains, including but not limited to various commercially available polyimide resin products.

In one embodiment, the resin composition disclosed herein may optionally further comprise: flame retardant, inorganic filler, curing accelerator, solvent, silane coupling agent, coloring agent, toughening agent or a combination thereof.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac).

For example, the inorganic filler may be any one or more inorganic fillers used for preparing a prepreg, a resin film, a laminate or a printed circuit board; examples of the inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like in shape and can be optionally pretreated by a silane coupling agent.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethyl aminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne peroxide (25B), bis(tert-butylperoxy isopropyl) benzene or a combination thereof.

For example, the solvent is not particularly limited and may be any solvent suitable for dissolving the resin composition disclosed herein, example including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin compositions of various embodiments may be used for making different articles, including but not limited to a prepreg, a resin film, a laminate or a printed circuit board.

For example, the resin composition according to each of the various embodiments may be used to make a prepreg, which has a reinforcement material and a layered structure (e.g., insulation layer) formed thereon, wherein the layered structure is made by heating the resin composition to a semi-cured state (B-Stage) at a temperature for example between 120° C. and 160° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition according to each of the various embodiments may be coated on a liquid crystal resin film, a polyester (PET) film, a polyimide (PI) film, a copper foil or a resin-coated copper (RCC), followed by baking and heating to the semi-cured state (B-Stage) to obtain a resin film.

For example, resin compositions of various embodiments of the present disclosure may be made into a laminate, such as a copper-clad laminate, which comprises two copper foils and an insulation layer disposed between the copper foils, wherein the insulation layer is formed by curing the resin compositions at high temperature and high pressure, a suitable curing temperature being for example between 190° C. and 220° C. and preferably between 200° C. and 215° C. and a suitable curing time being 90 to 180 minutes and preferably 110 to 150 minutes. The insulation layer may be obtained by curing the aforesaid prepreg or resin film. In one preferred embodiment, the laminate is a copper-clad laminate.

In one embodiment, the laminate may be further processed by trace formation processes to provide a printed circuit board.

Articles made from the resin composition disclosed herein achieves at least one or more of the properties including low prepreg viscosity variation ratio, high prepreg stickiness resistance, less void after lamination, high multi-layer board thermal resistance, high glass transition temperature, low ratio of thermal expansion, high copper foil peeling strength, low dissipation factor, and good laminate appearance.

For example, the resin composition according to the present disclosure or the article made therefrom may achieve one, more or all of the following properties:

a prepreg viscosity variation ratio of less than or equal to 10%, such as between 1% and 10%, between 1.5% and 9.3%, or between 1.5% and 5.6%;

absence of stickiness between two adjacent prepreg surfaces;

absence of void after lamination (i.e., the amount of void after lamination is zero);

no delamination after subjecting the article to a multi-layer board thermal resistance test by reference to IPC-TM-650 2.4.13.1;

a glass transition temperature as measured by reference to IPC-TM-650 2.4.24.4 of greater than or equal to 210° C., such as greater than or equal to 211° C., or such as between 210° C. and 230° C. or between 211° C. and 230° C.;

a ratio of thermal expansion as measured by reference to IPC-TM-650 2.4.24.5 of less than or equal to 2.5%, such as between 1.7% and 2.5%;

a copper foil peeling strength as measured by reference to IPC-TM-650 2.4.8 of greater than or equal to 3.1 lb/in, such as between 3.1 lb/in and 3.8 lb/in;

a dissipation factor as measured by reference to JIS C2565 at 10 GHz of less than or equal to 0.0020, such as between 0.0016 and 0.0020 or between 0.0016 and 0.0019; and passing a visual inspection test of laminate appearance, such as no dry board or uneven thickness observed from laminate appearance.

Materials and reagents used in Examples and Comparative Examples disclosed herein are listed below:

SA9000: dimethacrylate-terminated polyphenylene ether resin with a number average molecular weight (Mn) of about 1900 to 2300, available from Sabic.

OPE-2st 1200: bis(vinylbenzyl)-terminated polyphenylene ether resin with a number average molecular weight (Mn) of about 1200, available from Mitsubishi Gas Chemical Co., Inc.

OPE-2st 2200: bis(vinylbenzyl)-terminated polyphenylene ether resin with a number average molecular weight (Mn) of about 2200, available from Mitsubishi Gas Chemical Co., Inc.

Compound D: bis(vinylphenyl) ethane, monomer content 99.8%, content of para-para vinyl groups 99.0%, available from Linchuan Chemical Co., Ltd.

Compound E: bis(vinylphenyl) hexane, monomer content 95.5%, content of para-para vinyl groups 94.3%, available from Linchuan Chemical Co., Ltd.

Compound F: bis(vinylphenyl) dimethylbenzene, monomer content 96.7%, content of para-para vinyl groups 94.7%, available from Linchuan Chemical Co., Ltd.
Compound G: bis(vinylphenyl) dimethyl ether, monomer content 96.1%, content of para-para vinyl groups 93.9%, available from Linchuan Chemical Co., Ltd.
Compound H: bis(vinylphenyl) diethylbenzene, monomer content 96.5%, content of para-para vinyl groups 94.1%, available from Linchuan Chemical Co., Ltd.
Prepolymerized Resin I: a prepolymerized resin of bis (vinylphenyl) ethane and t-butyl styrene in a ratio of part by weight of 4:1, prepared as Synthesis Example 1.
Compound J: compound of Formula (5), available from MERCK.
Compound K: compound of Formula (7), available from MERCK.
Compound L: compound of Formula (10), available from MERCK.
Compound M: compound of Formula (11), available from MERCK.
Compound N: compound of Formula (14), available from Guangdong Wengjiang Chemical Reagent Co., Ltd.
4-t-butylcatechol: available from DIC Corporation.
1,4-benzoquinone: available from MERCK.
1,1-diphenyl-2-picrylhydrazyl radical: available from Aladdin Industrial Corporation.
SR-833S: tricyclodecane dimethanol diacrylate, available from Sartomer.
B-1000: polybutadiene, available from Nippon Soda Co., Ltd.
SC-2500 SVJ: spherical silica pre-treated by silane coupling agent, available from Admatechs.
25B: 2,5-dimethyl-2,5-di(t-butylperoxy)-3-hexyne peroxide, available from NOF Corporation.
Mixture of toluene and methyl ethyl ketone (weight ratio of 2:1): prepared by Applicant, wherein the toluene and the methyl ethyl ketone are both commercially available.
t-butyl styrene: available from Tokyo Chemical Industry Co., Ltd.

Synthesis Example 1

10 parts by weight of t-butyl styrene and a proper amount of toluene were added to a stirred reaction tank, and then 0.25 part by weight of dicumyl peroxide was fully dissolved in toluene and added to the stirred reaction tank, followed by continuously stirring the reaction at 85° C. for 1-2.5 hours. The reaction tank was protected with inert gas during the reaction. After 1-2.5 hours, the temperature of the reaction tank was lowered to 62-80° C. 40 parts by weight of bis(vinylphenyl) ethane (i.e., Compound D) and 0.2 part by weight of 2,4-diphenyl-4-methyl-1-pentene were fully dissolved in toluene and added to the reaction tank via a constant pressure funnel; during the addition process, which was finished within 0.5-1 hour, the temperature was kept at 80° C. and the reaction was stirred continuously. After 1-2.5 hours of reaction at 62-80° C. with stirring, the temperature of the reaction tank was lowered to 45-60° C., and a proper amount of 4-methoxyphenol was added; the reaction was further stirred for 0.5-1.5 hours, then the temperature was lowered to room temperature, and the solution obtained was purified to obtain a product, which is the Prepolymerized Resin I.

Samples (specimens) were prepared as described below and tested and analyzed under specified conditions below.
1. Prepreg: Resin composition from each Example or each Comparative Example (in part by weight) was separately well-mixed in a stirred tank to form a varnish, wherein the "proper amount" of the mixture of toluene and methyl ethyl ketone (weight ratio of 2:1) as the solvent represents an amount of the solvent mixture capable of resulting in a solid content of 60% (S/C=60%) of the resin composition in the varnish. Then the varnish was loaded to an impregnation tank; a fiberglass fabric (e.g., 2116, 1080 or 1027 L-glass fiber fabric, available from Asahi) was impregnated into the impregnation tank to adhere the resin composition onto the fiberglass fabric, followed by heating and baking at 140° C. for about 4 minutes to obtain a prepreg.
2. Copper-containing laminate (a.k.a. copper-clad laminate, 8-ply, formed by lamination of eight prepregs): Two 18 μm HVLP (hyper very low profile) copper foils and eight prepregs obtained from 2116 L-glass fiber fabrics impregnated with each Example or Comparative Example and having a resin content of about 55% were prepared and stacked in the order of one copper foil, eight prepregs and one copper foil, followed by lamination under vacuum at 30 kgf/cm$^2$ and 200° C. for 120 minutes to form a copper-containing laminate. Insulation layers were formed by laminating eight sheets of prepreg between the two copper foils, and the resin content of the insulation layers is about 55%.
3. Copper-containing laminate (a.k.a. copper-clad laminate, 2-ply, formed by lamination of two prepregs): Two 18 μm HVLP (hyper very low profile) copper foils and two prepregs obtained from 1080 L-glass fiber fabrics impregnated with each Example or Comparative Example and having a resin content of about 70% were prepared and stacked in the order of one copper foil, two prepregs and one copper foil, followed by lamination under vacuum at 30 kgf/cm$^2$ and 200° C. for 120 minutes to form a copper-containing laminate. Insulation layers were formed by laminating two sheets of prepreg between the two copper foils, and the resin content of the insulation layers is about 70%.
4. Copper-free laminate (8-ply, formed by lamination of eight prepregs): Each aforesaid copper-containing laminate (8-ply) was etched to remove the two copper foils to obtain a copper-free laminate (8-ply) formed by laminating eight sheets of prepreg and having a resin content of about 55%.
5. Copper-free laminate (2-ply, formed by lamination of two prepregs): Each aforesaid copper-containing laminate (2-ply) was etched to remove the two copper foils to obtain a copper-free laminate (2-ply) formed by laminating two sheets of prepreg and having a resin content of about 70%.

For each sample, test items and test methods are described below.

Prepreg Viscosity Variation Ratio

The prepreg prepared from the resin composition of each Example or each Comparative Example was rubbed with hands to obtain resin powder, which was then passed through a 60-mesh screen to obtain the sample powder. 0.15 g of the sample powder was poured on the heating plate of a cone and plate viscometer (temperature set as 175° C. and rotational speed set as 11.7 rpm) for testing, and the minimum viscosity was recorded. The viscosity values measured from each prepreg placed at 30° C. for one day and for thirty days were respectively recorded as V1 and V30 to calculate the viscosity variation ratio, which is equal to ((V30−V1)/V1)*100%. If a prepreg has a higher viscosity variation ratio, the prepreg will have shorter shelf life and may be deteriorated more easily, resulting in poor yield in the subsequent circuit board processes.

Prepreg Stickiness Resistance

The prepreg obtained from a 2116 L-glass fiber fabric impregnated with each Example or Comparative Example was prepared, and a plurality of prepregs from the same Example or Comparative Example were placed into and vacuum-packed by an aluminium foil bag. Then the bag was placed at 35° C. for 24 hours, and then the prepregs were removed from the bag for inspection to determine whether surface stickiness occurs between adjacent prepregs. If stickiness was not observed, a designation of "OK" is given; if stickiness was observed, a designation of "NG" is given. Prepreg stickiness will lower the yield in the subsequent laminate or circuit board processes.

Amount of Void after Lamination

A 2.5 mil copper-containing laminate was subject to a conventional brown oxidation process to make a brown oxide treated wiring laminate as the inner layer used to evaluate the capability of resin flowing to and filling the open area between traces during prepreg lamination. The varnish of the resin composition from each Example or each Comparative Example was used to impregnate a 1027 L-glass fiber fabric and then heated at 140° C. for 4 minutes to obtain a prepreg with a resin content of about 71% to 73%. The 2.5 mil brown oxide treated wiring laminate was covered on both sides with the aforesaid prepreg (obtained by impregnating a 1027 L-glass fiber fabric with the resin composition from each Example or each Comparative Example), and then the outermost layers were respectively covered with a 18 μm HVLP (hyper very low profile) copper foil. Lamination was performed for 2 hours by using a vacuum laminator at 450 psi and 200° C. to form an inner layer wiring laminate with surface copper, and then the outermost copper foils were removed by etching to obtained an inner layer wiring laminate without surface copper. The copper-free surface of the inner layer wiring laminate without surface copper was examined with naked eyes to determine whether void exists and calculate the amount of void. The presence of void in the laminate after lamination will result in unacceptable defective circuit boards.

Multi-Layer Board Thermal Resistance

A core was prepared as follows: a prepreg (resin content of about 55%) prepared from each Example or each Comparative Example impregnated with a 2116 L-glass fiber fabric was superimposed on both sides with a piece of 18 μm HVLP copper foil, followed by lamination and curing for 2 hours under vacuum at high temperature (200° C.) and high pressure (420 psi) to obtain a copper-clad core. Then the copper-clad core obtained above was etched to remove the copper foils on both sides so as to obtain a copper-free core (5 mil in thickness). Three copper-free cores were prepared as above. Next, two 18 μm HVLP copper foils and eight prepregs (resin content of about 70%) obtained from 1080 L-glass fiber fabrics impregnated with each Example or Comparative Example were prepared and stacked in the order of one copper foil, two prepregs (obtained from 1080 L-glass fiber fabrics), one copper-free core, two prepregs (obtained from 1080 L-glass fiber fabrics), one copper-free core, two prepregs (obtained from 1080 L-glass fiber fabrics), one copper-free core, two prepregs (obtained from 1080 L-glass fiber fabrics), and one copper foil, followed by lamination under vacuum at 420 psi and 200° C. for 2 hours to form an eight-layer copper-clad laminate. The eight-layer copper-clad laminate was then cut to form a 5.9 inch*2.2 inch rectangular sample, the sample was subject to a circuit board drilling process to form a total of 500 through holes with a diameter of 0.3 mm (i.e., a 20*25 array of through holes, the vertical distance of adjacent hole walls being 0.25 mm), and then the hole walls were copper-plated to obtain a sample for multi-layer board thermal resistance test.

In the multi-layer board thermal resistance test, the aforesaid sample for multi-layer board thermal resistance test was horizontally placed on (i.e., in contact with) the solder bath of a 288° C. solder pot by reference to IPC-TM-650 2.4.13.1; during each test, one surface of the sample was placed on the solder bath for 10 seconds and then removed therefrom and cooled at room temperature for 30 seconds, and then the same surface of the sample was placed on the solder bath for 10 seconds again and then removed and cooled at room temperature for 30 seconds. Each 10 seconds on the solder bath plus cooling at room temperature for 30 seconds is one cycle, and a total of 6 cycles were repeated. The sample was sectioned and observed with an optical microscope to determine the presence or absence of delamination. Absence of delamination after 6 floating cycles is designated as "O" to represent no delamination; presence of delamination after 6 floating cycles is designated as "X" to represent delamination. Three samples were tested for each Example or Comparative Example. In the test results, a designation with one "X" represents that delamination occurs in one sample, a designation with two "X" represents that delamination occurs in two samples, and a designation with three "X" represents that delamination occurs in all three samples. For example, inter-layer separation between insulation layers is considered as delamination. Interlayer delamination or blistering may occur between any layers of the laminate.

Glass Transition Temperature (Tg)

A copper-free laminate sample (obtained by laminating eight prepregs) was subject to the glass transition temperature measurement. The glass transition temperature (in ° C.) of each sample was measured using a dynamic mechanical analysis (DMA) method by reference to IPC-TM-650 2.4.24.4 at a temperature range of 35° C. to 270° C. with a temperature increase rate of 2° C./minute. Higher glass transition temperature represents a better property of the sample.

Ratio of Thermal Expansion

The copper-free laminate (obtained by laminating eight prepregs) sample was subject to thermal mechanical analysis (TMA) during the ratio of thermal expansion (Z-axis) measurement. Each sample was heated from 35° C. to 270° C. at a temperature increase rate of 10° C./minute and then subject to the measurement of ratio of thermal expansion (%) in Z-axis from 50° C. to 260° C. by reference to the processes described in IPC-TM-650 2.4.24.5. Lower ratio of thermal expansion represents a better property of the sample. Generally, a difference in ratio of thermal expansion of greater than or equal to 0.1% represents a substantial difference.

Copper Foil Peeling Strength (a.k.a. Peeling Strength, P/S)

The aforesaid copper-clad laminate (obtained by laminating eight prepregs) was cut into a rectangular sample with a width of 24 mm and a length of greater than 60 mm, which was etched to remove surface copper foil to leave a rectangular copper foil strip with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate. In the technical field to which the present disclosure pertains, higher copper foil peeling strength is better. For a copper-clad laminate with a dissipation factor of less than 0.0040 under a 10 GHz frequency, a difference in copper foil peeling strength of greater than or equal to 0.1 lb/in represents a significant difference.

Dissipation factor (Df)

The aforesaid copper-free laminate (obtained by laminating two prepregs) was subject to dissipation factor measurement. Each sample was measured by using a microwave dielectrometer (available from AET Corp.) by reference to JIS C2565 at room temperature (about 25° C.) and under a 10 GHz frequency. Lower dissipation factor represents better dielectric properties of the sample. Under a 10 GHz frequency, for a Df value of less than 0.0040, a difference in Df of less than 0.0001 represents no substantial difference (i.e., no significant technical difficulty) in dissipation factor in different laminates, and a difference in Df of greater than or equal to 0.0001 represents a significant difference in dissipation factor in different laminates.

Laminate Appearance

Figure 2:
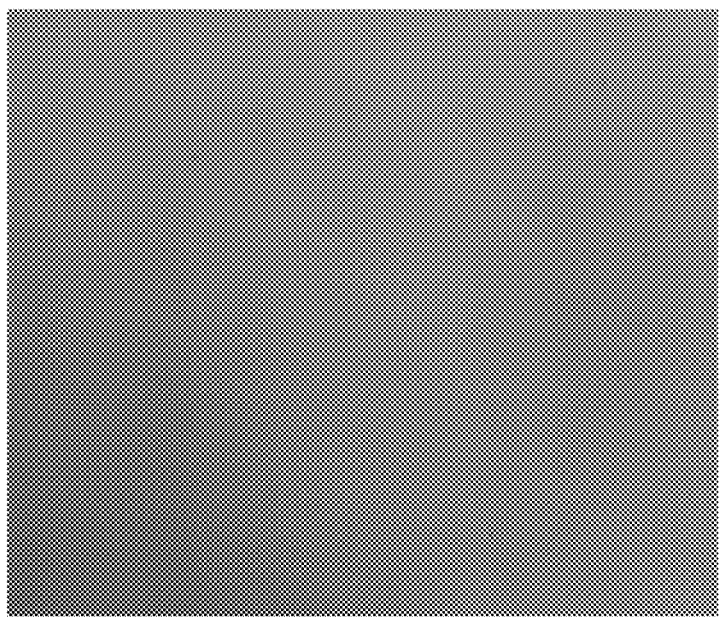
FIG. 2 illustrates a normal laminate without dry board.

The aforesaid copper-free laminate (obtained by laminating eight prepregs) was subject to visual inspection with naked eyes to determine whether dry board (as illustrated in FIG. 1, forming weave exposure) or uneven thickness of the laminate appeared on the surface of the outmost insulation layer of the copper-free laminate. Uneven thickness was determined by evaluating the thickness at 7 points of the copper-free laminate randomly chosen and measured by using a laminate thickness measurement instrument. The standard thickness was 38 mil. Uneven thickness occurred if the thickness measured from any one of the 7 points exceeded ±8% of the standard thickness. Absence of dry board or absence of uneven thickness represents normal appearance of the laminate (as illustrated in FIG. 2). A designation of "OK" in the test result was given to represent normal appearance of the laminate. If dry board or uneven thickness occurred, a designation of "dry board" or "uneven thickness" was given.

Compositions and test results of resin compositions of Examples and Comparative Examples are listed in the tables below (in part by weight), wherein a ratio of part by weight of the compound of Formula (2), the compound of Formula (3), the compound of Formula (4) or combination thereof to the compound of Formula (1) is represented by scientific notation, such as "1.67E-2" represents "$1.67*10^{-2}$" for example.

TABLE 1

Resin compositions of Examples (in part by weight) and test results

| Component | | E1 | E2 | E3 | E4 | E5 | E6 |
|---|---|---|---|---|---|---|---|
| vinyl-containing polyphenylene ether resin | SA9000 | 100 | 100 | 100 | | | 100 |
| | OPE-2st 1200 | | | | 100 | | |
| | OPE-2st 2200 | | | | | 100 | |
| compound of Formula (1) | Compound D | 60 | 60 | 60 | 60 | 60 | |
| | Compound E | | | | | | 60 |
| | Compound F | | | | | | |
| | Compound G | | | | | | |
| | Compound H | | | | | | |
| | Prepolymerized Resin I | | | | | | |
| compound of Formula (2), Formula (3) or Formula (4) | Compound J | 1 | 0.01 | 4 | | | 0.068 |
| | Compound K | | | | 0.5 | 0.5 | |
| | Compound L | | | | | | |
| | Compound M | | | | | | |
| | Compound N | | | | | | |
| others | 4-t-butylcatechol | | | | | | |
| | 1,4-benzoquinone | | | | | | |
| | 1,1-diphenyl-2-picrylhydrazyl radical | | | | | | |
| acrylate | SR-833S | | | | | | |
| polyolefin | B-1000 | 40 | 40 | 40 | 40 | 40 | 40 |
| inorganic filler | SC-2500 SVJ | 120 | 120 | 120 | 120 | 120 | 120 |
| peroxide | 25B | 1 | 1 | 1 | 1 | 1 | 1 |
| solvent | toluene:MEK = 2:1 | PA | PA | PA | PA | PA | PA |
| ratio of part by weight of Formula (2) + Formula (3) + Formula (4) to Formula (1) | | 1.67E-2 | 1.67E-4 | 6.67E-2 | 8.33E-3 | 8.33E-3 | 1.13E-3 |

| Item | Unit | E1 | E2 | E3 | E4 | E5 | E6 |
|---|---|---|---|---|---|---|---|
| viscosity variation ratio | % | 3.2 | 5.6 | 1.5 | 5.2 | 4.5 | 3.9 |
| stickiness resistance | / | OK | OK | OK | OK | OK | OK |
| amount of void after lamination | / | none | none | none | none | none | none |
| thermal resistance | / | OOO | OOO | OOO | OOO | OOO | OOO |
| glass transition temperature | ° C. | 217 | 218 | 215 | 228 | 221 | 215 |
| ratio of thermal expansion | % | 2.3 | 2.2 | 2.3 | 1.7 | 2.1 | 2.4 |
| copper foil peeling strength | lb/in | 3.3 | 3.3 | 3.2 | 3.5 | 3.3 | 3.2 |
| dissipation factor | / | 0.0016 | 0.0016 | 0.0016 | 0.0018 | 0.0016 | 0.0017 |
| laminate appearance | / | OK | OK | OK | OK | OK | OK |

As used herein, "PA" represent "proper amount".

TABLE 2

Resin compositions of Examples (in part by weight) and test results

| Component | | E7 | E8 | E9 | E10 | E11 | E12 |
|---|---|---|---|---|---|---|---|
| vinyl-containing polyphenylene ether resin | SA9000 | 30 | 48 | 100 | 100 | 100 | 100 |
| | OPE-2st 1200 | 25 | | | | | |
| | OPE-2st 2200 | 45 | 52 | | | | |
| compound of Formula (1) | Compound D | | | | | | 20 |
| | Compound E | | | | | | |
| | Compound F | 12 | | | | | |
| | Compound G | 23 | 90 | | | | |
| | Compound H | 25 | | | | | |
| | Prepolymerized Resin I | | | 60 | 20 | 100 | |
| compound of Formula (2), Formula (3) or Formula (4) | Compound J | 1 | 0.03 | 0.2 | 0.2 | 0.2 | 0.5 |
| | Compound K | | 0.02 | | | | |
| | Compound L | | 0.2 | | | | |
| | Compound M | | 0.15 | | | | |
| | Compound N | | 0.15 | | | | |
| others | 4-t-butylcatechol | | | | | | |
| | 1,4-benzoquinone | | | | | | |
| | 1,1-diphenyl-2-picrylhydrazyl radical | | | | | | |
| acrylate | SR-833S | | | | | | |
| polyolefin | B-1000 | 40 | 30 | 40 | 40 | 40 | 40 |
| inorganic filler | SC-2500 SVJ | 120 | 160 | 120 | 120 | 120 | 120 |
| peroxide | 25B | 1 | 0.6 | 1 | 1 | 1 | 1 |
| solvent | toluene:MEK = 2:1 | PA | PA | PA | PA | PA | PA |
| ratio of part by weight of Formula (2) + Formula (3) + Formula (4) to Formula (1) | | 1.67E−2 | 6.11E−3 | 3.33E−3 | 1.00E−2 | 2.00E−3 | 2.50E−2 |

| Item | Unit | E7 | E8 | E9 | E10 | E11 | E12 |
|---|---|---|---|---|---|---|---|
| viscosity variation ratio | % | 3.9 | 3.7 | 2.6 | 4.0 | 2.2 | 3.5 |
| stickiness resistance | / | OK | OK | OK | OK | OK | OK |
| amount of void after lamination | / | none | none | none | none | none | none |
| thermal resistance | / | OOO | OOO | OOO | OOO | OOO | OOO |
| glass transition temperature | °C. | 220 | 226 | 217 | 214 | 228 | 213 |
| ratio of thermal expansion | % | 2.0 | 1.8 | 2.3 | 2.0 | 1.7 | 2.5 |
| copper foil peeling strength | lb/in | 3.4 | 3.4 | 3.8 | 3.6 | 3.4 | 3.6 |
| dissipation factor | / | 0.0017 | 0.0017 | 0.0016 | 0.0017 | 0.0018 | 0.0019 |
| laminate appearance | / | OK | OK | OK | OK | OK | OK |

TABLE 3

Resin compositions of Examples (in part by weight) and test results

| Component | | E13 | E14 | E15 | E16 | E17 | E18 |
|---|---|---|---|---|---|---|---|
| vinyl-containing polyphenylene ether resin | SA9000 | 100 | 80 | 100 | 100 | 80 | 80 |
| | OPE-2st 1200 | | 20 | | | 20 | 20 |
| | OPE-2st 2200 | | | | | | |
| compound of Formula (1) | Compound D | | | 12 | 100 | | |
| | Compound E | 30 | 30 | | | 60 | 60 |
| | Compound F | | | | | | |
| | Compound G | | | | | | |
| | Compound H | | | | | | |
| | Prepolymerized Resin I | 30 | 30 | | | | |
| compound of Formula (2), Formula (3) or Formula (4) | Compound J | 1 | | 1 | 1 | | |
| | Compound K | | 0.2 | | | 1 | |
| | Compound L | | | | | | 1 |
| | Compound M | | | | | | |
| | Compound N | | | | | | |

TABLE 3-continued

Resin compositions of Examples (in part by weight) and test results

| others | 4-t-butylcatechol | | | | | | |
|---|---|---|---|---|---|---|---|
| | 1,4-benzoquinone | | | | | | |
| | 1,1-diphenyl-2-picrylhydrazyl radical | | | | | | |
| acrylate | SR-833S | | | | | | |
| polyolefin | B-1000 | 40 | 40 | 40 | 40 | 40 | 40 |
| inorganic filler | SC-2500 SVJ | 120 | 120 | 120 | 120 | 120 | 120 |
| peroxide | 25B | 1 | 1 | 1 | 1 | 1 | 1 |
| solvent | toluene:MEK = 2:1 | PA | PA | PA | PA | PA | PA |
| ratio of part by weight of Formula (2) + Formula (3) + Formula (4) to Formula (1) | | 1.67E−2 | 3.33E−3 | 8.33E−2 | 1.00E−2 | 1.67E−2 | 1.67E−2 |

| Item | Unit | E13 | E14 | E15 | E16 | E17 | E18 |
|---|---|---|---|---|---|---|---|
| viscosity variation ratio | % | 2.9 | 4.7 | 2.5 | 4.9 | 3.2 | 5.2 |
| stickiness resistance | / | OK | OK | OK | OK | OK | OK |
| amount of void after lamination | / | none | none | none | none | none | none |
| thermal resistance | / | OOO | OOO | OOO | OOO | OOO | OOO |
| glass transition temperature | °C. | 216 | 221 | 213 | 230 | 217 | 213 |
| ratio of thermal expansion | % | 2.4 | 2.1 | 2.5 | 1.8 | 2.2 | 2.3 |
| copper foil peeling strength | lb/in | 3.4 | 3.5 | 3.6 | 3.1 | 3.4 | 3.4 |
| dissipation factor | / | 0.0016 | 0.0017 | 0.0017 | 0.0019 | 0.0017 | 0.0018 |
| laminate appearance | / | OK | OK | OK | OK | OK | OK |

TABLE 4

Resin compositions of Examples (in part by weight) and test results

| | Component | E19 | E20 | E21 | E22 |
|---|---|---|---|---|---|
| vinyl-containing polyphenylene ether resin | SA9000 | 80 | 80 | 100 | 80 |
| | OPE-2st 1200 | 20 | 20 | | 20 |
| | OPE-2st 2200 | | | | |
| compound of Formula (1) | Compound D | | 60 | | |
| | Compound E | 60 | | 60 | 60 |
| | Compound F | | | | |
| | Compound G | | | | |
| | Compound H | | | | |
| | Prepolymerized Resin I | | | | |
| compound of Formula (2), Formula (3) or Formula (4) | Compound J | | 0.8 | 0.005 | |
| | Compound K | | | | |
| | Compound L | | | | |
| | Compound M | 1 | | | |
| | Compound N | | | | 1 |
| others | 4-t-butylcatechol | | 0.2 | | |
| | 1,4-benzoquinone | | | | |
| | 1,1-diphenyl-2-picrylhydrazyl radical | | | | |
| acrylate | SR-833S | | | | |
| polyolefin | B-1000 | 40 | 40 | 40 | 40 |
| inorganic filler | SC-2500 SVJ | 120 | 120 | 120 | 120 |
| peroxide | 25B | 1 | 1 | 1 | 1 |
| solvent | toluene:MEK = 2:1 | PA | PA | PA | PA |
| ratio of part by weight of Formula (2) + Formula (3) + Formula (4) to Formula (1) | | 1.67E−2 | 1.33E−2 | 8.33E−5 | 1.67E−2 |

| Item | Unit | E19 | E20 | E21 | E22 |
|---|---|---|---|---|---|
| viscosity variation ratio | % | 5.5 | 1.9 | 9.3 | 3.5 |
| stickiness resistance | / | OK | OK | OK | OK |
| amount of void after lamination | / | none | none | none | none |
| thermal resistance | / | OOO | OOO | OOO | OOO |
| glass transition temperature | °C. | 211 | 223 | 212 | 222 |

TABLE 4-continued

| Resin compositions of Examples (in part by weight) and test results | | | | | |
|---|---|---|---|---|---|
| ratio of thermal expansion | % | 2.3 | 2.1 | 2.4 | 2.0 |
| copper foil peeling strength | lb/in | 3.4 | 3.3 | 3.1 | 3.5 |
| dissipation factor | / | 0.0018 | 0.0017 | 0.0020 | 0.0018 |
| laminate appearance | / | OK | OK | dry board | OK |

TABLE 5

| Resin compositions of Comparative Examples (in part by weight) and test results | | | | | | |
|---|---|---|---|---|---|---|
| Component | | C1 | C2 | C3 | C4 | C5 |
| vinyl-containing polyphenylene ether resin | SA9000 | 100 | 80 | 80 | 80 | 80 |
| | OPE-2st 1200 | | 20 | 20 | 20 | 20 |
| | OPE-2st 2200 | | | | | |
| compound of Formula (1) | Compound D | 60 | | | | |
| | Compound E | | 30 | 60 | 60 | 60 |
| | Compound F | | | | | |
| | Compound G | | | | | |
| | Compound H | | | | | |
| | Prepolymerized Resin I | | 30 | | | |
| compound of Formula (2), Formula (3) or Formula (4) | Compound J | | | | | |
| | Compound K | | | | | |
| | Compound L | | | | | |
| | Compound M | | | | | |
| | Compound N | | | | | |
| others | 4-t-butylcatechol | | | 1 | | |
| | 1,4-benzoquinone | | | | 1 | |
| | 1,1-diphenyl-2-picrylhydrazyl radical | | | | | 1 |
| acrylate | SR-833S | | | | | |
| polyolefin | B-1000 | 40 | 40 | 40 | 40 | 40 |
| inorganic filler | SC-2500 SVJ | 120 | 120 | 120 | 120 | 120 |
| peroxide | 25B | 1 | 1 | 1 | 1 | 1 |
| solvent | toluene:MEK = 2:1 | PA | PA | PA | PA | PA |
| ratio of part by weight of Formula (2) + Formula (3) + Formula (4) to Formula (1) | | 0 | 0 | 0 | 0 | 0 |

| Item | Unit | C1 | C2 | C3 | C4 | C5 |
|---|---|---|---|---|---|---|
| viscosity variation ratio | % | 14.7 | 16.4 | 5.9 | 4.8 | 8.1 |
| stickiness resistance | / | NG | NG | OK | OK | OK |
| amount of void after lamination | / | >30 | >30 | 12 | 10 | 20 |
| thermal resistance | / | XXX | XXX | OOX | OOX | OXX |
| glass transition temperature | °C. | 218 | 220 | 202 | 203 | 204 |
| ratio of thermal expansion | % | 2.2 | 2.1 | 2.6 | 2.6 | 2.6 |
| copper foil peeling strength | lb/in | 3.3 | 3.5 | 2.8 | 2.7 | 2.9 |
| dissipation factor | / | 0.0016 | 0.0017 | 0.0018 | 0.0018 | 0.0018 |
| laminate appearance | / | dry board | dry board | uneven thickness | uneven thickness | uneven thickness |

TABLE 6

| Resin compositions of Comparative Examples (in part by weight) and test results | | | | | |
|---|---|---|---|---|---|
| Component | | C6 | C7 | C8 | C9 |
| vinyl-containing polyphenylene ether resin | SA9000 | | 100 | 100 | 100 |
| | OPE-2st 1200 | | | | |
| | OPE-2st 2200 | | | | |
| compound of Formula (1) | Compound D | 60 | | | 20 |
| | Compound E | | | | |
| | Compound F | | | | |

TABLE 6-continued

Resin compositions of Comparative Examples (in part by weight) and test results

| compound of Formula (2), Formula (3) or Formula (4) | Compound G Compound H Prepolymerized Resin I Compound J Compound K Compound L Compound M Compound N | 1 | 1 | 1 | 5 |
|---|---|---|---|---|---|
| others | 4-t-butylcatechol 1,4-benzoquinone 1,1-diphenyl-2-picrylhydrazyl radical | | | | |
| acrylate | SR-833S | | | 60 | |
| polyolefin | B-1000 | 40 | 40 | 40 | 40 |
| inorganic filler | SC-2500 SVJ | 120 | 120 | 120 | 120 |
| peroxide | 25B | 1 | 1 | 1 | 1 |
| solvent | toluene:MEK = 2:1 | PA | PA | PA | PA |
| ratio of part by weight of Formula (2) + Formula (3) + Formula (4) to Formula (1) | | 1.67E−2 | / | / | 2.50E−1 |

| Item | Unit | C6 | C7 | C8 | C9 |
|---|---|---|---|---|---|
| viscosity variation ratio | % | 3.3 | 3.1 | 6.7 | 2.2 |
| stickiness resistance | / | NG | OK | OK | NG |
| amount of void after lamination | / | 22 | none | none | >30 |
| thermal resistance | / | XXX | OOX | OOX | XXX |
| glass transition temperature | °C. | 218 | 210 | 215 | 196 |
| ratio of thermal expansion | % | 1.8 | 2.8 | 2.7 | 3.0 |
| copper foil peeling strength | lb/in | 1.9 | 3.5 | 3.9 | 2.6 |
| dissipation factor | / | 0.0015 | 0.0021 | 0.0035 | 0.0033 |
| laminate appearance | / | uneven thickness | dry board | dry board | uneven thickness |

The following observations can be made according to the test results above.

Comparison of Examples E1 to E22 and Comparative Examples C1 and C2 indicates that if the resin composition does not contain the compound of Formula (2), Formula (3), Formula (4) or a combination thereof, several disadvantages will be observed, including high prepreg viscosity variation ratio (poor shelf life), poor prepreg stickiness resistance, presence of voids after lamination, delamination in the multi-layer board thermal resistance test and dry board in laminate appearance.

Comparison of Examples E1 to E22 and Comparative Examples C3 to C5 indicates that if the resin composition does not contain the compound of Formula (2), Formula (3), Formula (4) or a combination thereof but contains such as 4-t-butylcatechol, 1,4-benzoquinone or 1,1-diphenyl-2-picrylhydrazyl radical, several disadvantages will be observed, including presence of voids after lamination, delamination in the multi-layer board thermal resistance test, significantly lowered glass transition temperature, increased ratio of thermal expansion, lowered copper foil peeling strength and uneven thickness in laminate appearance.

Comparison of Examples E1 to E22 and Comparative Example C6 indicates that if the resin composition does not contain a vinyl-containing polyphenylene ether resin, several disadvantages will be observed, including poor prepreg stickiness resistance, presence of voids after lamination, delamination in the multi-layer board thermal resistance test, lowered copper foil peeling strength and uneven thickness in laminate appearance.

Comparison of Examples E1 to E22 and Comparative Example C7 indicates that if the resin composition does not contain the compound of Formula (1), several disadvantages will be observed, including delamination in the multi-layer board thermal resistance test, increased ratio of thermal expansion, increased dissipation factor, and dry board in laminate appearance.

Comparison of Examples E1 to E22 and Comparative Example C8 indicates that if the resin composition contains an acrylate in place of the compound of Formula (1), several disadvantages will be observed, including delamination in the multi-layer board thermal resistance test, increased ratio of thermal expansion, significantly increased dissipation factor, and dry board in laminate appearance.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   a vinyl-containing polyphenylene ether resin;
   a compound of Formula (1); and
   a compound of Formula (4), wherein a ratio of part by weight of the compound of Formula (4) to the compound of Formula (1) is between $8.33 \times 10^{-5}$ and $8.33 \times 10^{-2}$;

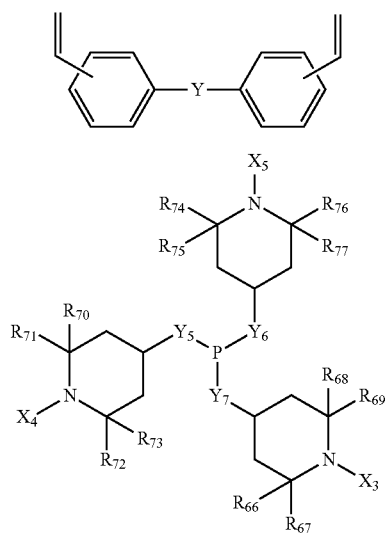

Formula (1)

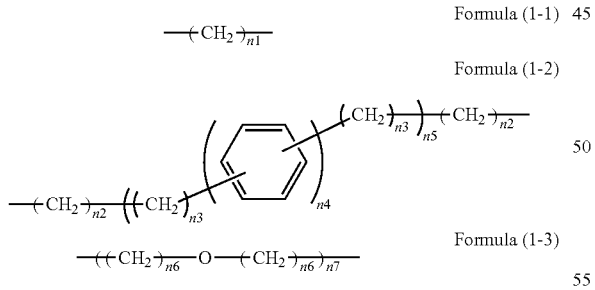

Formula (4)

wherein:
in Formula (1), Y is any one of Formula (1-1), Formula (1-2) and Formula (1-3) or a combination thereof:

$$-\!\!\!-\!\!(CH_2)_{n1}\!\!-\!\!\!-$$

Formula (1-1)

$$-\!\!\!-\!\!(CH_2)_{n2}\!\!-\!\!\!((CH_2)_{n3})\!\!-\!\!\!\underset{n4}{\bigcirc}\!\!\!\underset{n5}{((CH_2)_{n3})}\!\!\!-\!\!(CH_2)_{n2}\!\!-\!\!\!-$$

Formula (1-2)

$$-\!\!\!-\!\!((CH_2)_{n6}\!\!-\!\!O\!\!-\!\!(CH_2)_{n6})_{n7}\!\!-\!\!\!-$$

Formula (1-3)

wherein n1 represents an integer of 0 to 30, n2 represents an integer of 0 to 6, and n3, n4, n5, n6 and n7 each individually represent an integer of 1 to 6;
in Formula (4), $Y_5$, $Y_6$ and $Y_7$ each independently represent a methylene group, an ether group, a secondary amino group, a carbonyl group or a phenylene group, $X_3$, $X_4$ and $X_5$ each independently represent an oxygen radical or a hydroxyl group, $R_{66}$ to $R_{77}$ each independently represent a hydrogen atom or a C1-C$_5$ alkyl group, and $R_{66}$ to $R_{77}$ are not a hydrogen atom at the same time.

2. The resin composition of claim 1, comprising:
   100 parts by weight of the vinyl-containing polyphenylene ether resin;
   12 to 100 parts by weight of the compound of Formula (1); and
   0.005 to 4 parts by weight of the compound of Formula (4).

3. The resin composition of claim 1, wherein the ratio of part by weight of the compound of Formula (4) to the compound of Formula (1) is between $1.67 \times 10^{-4}$ and $8.33 \times 10^{-2}$.

4. The resin composition of claim 1, wherein the vinyl-containing polyphenylene ether resin comprises a vinylbenzyl-containing polyphenylene ether resin, a methacrylate-containing polyphenylene ether resin, an allyl-containing polyphenylene ether resin, a vinylbenzyl-modified bisphenol A polyphenylene ether resin, a chain-extended vinyl-containing polyphenylene ether resin or a combination thereof.

5. The resin composition of claim 1, wherein the compound of Formula (1) comprises its prepolymer, copolymer, homopolymer, derivative or a combination thereof.

6. The resin composition of claim 1, wherein the compound of Formula (1) comprises a compound of any one of Formula (1-4) to Formula (1-6) or a combination thereof:

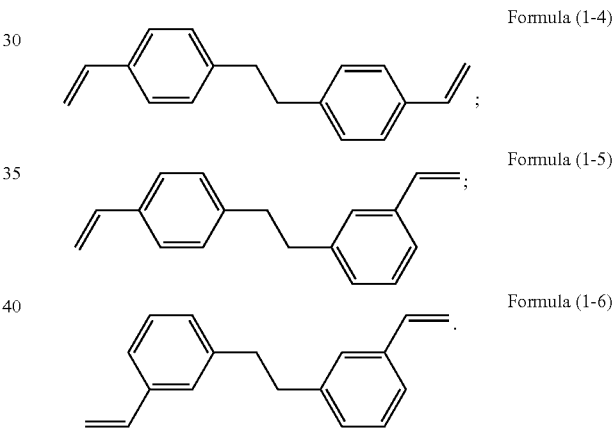

Formula (1-4)

Formula (1-5)

Formula (1-6)

7. The resin composition of claim 1, wherein the compound of Formula (4) comprises a compound of any one of Formula (14) to Formula (16) or a combination thereof:

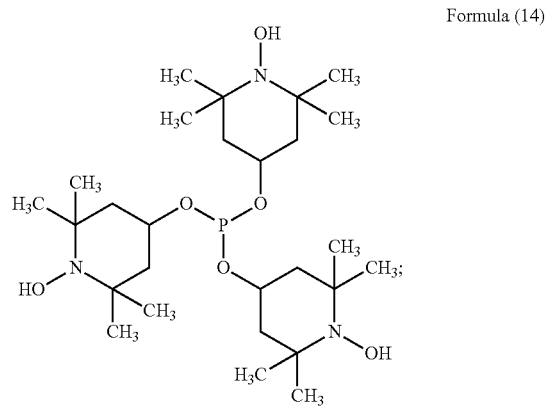

Formula (14)

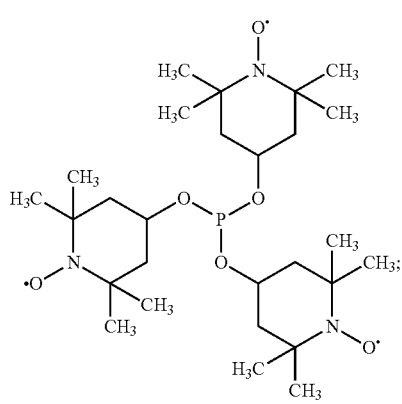

Formula (15)

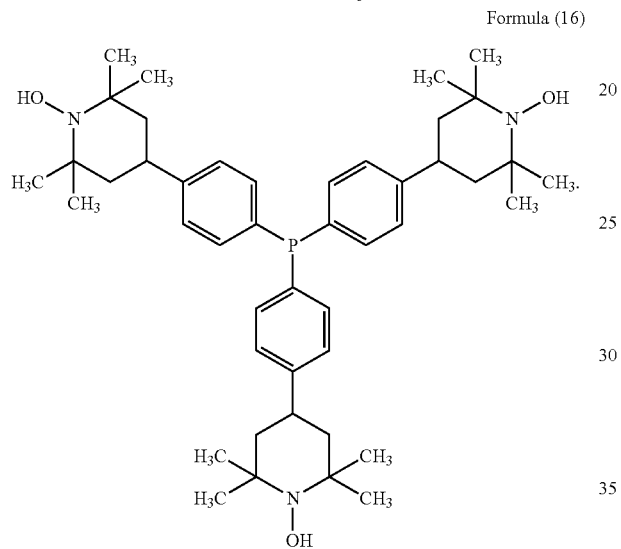

Formula (16)

8. The resin composition of claim 1, further comprising: an epoxy resin, a cyanate ester resin, a maleimide resin, a small molecule vinyl compound, an acrylate, a phenolic resin, a benzoxazine resin, a styrene maleic anhydride, a polyolefin, a polyester resin, an amine curing agent, a polyamide resin, a polyimide resin or a combination thereof.

9. The resin composition of claim 1, further comprising: flame retardant, inorganic filler, curing accelerator, solvent, silane coupling agent, coloring agent, toughening agent or a combination thereof.

10. An article made from the resin composition of claim 1, comprising a prepreg, a resin film, a laminate or a printed circuit board.

11. The article of claim 10, having a prepreg viscosity variation ratio of less than or equal to 10%.

12. The article of claim 10, characterized in that no delamination occurs after subjecting the article to a multi-layer board thermal resistance test by reference to IPC-TM-650 2.4.13.1.

13. The article of claim 10, having a glass transition temperature as measured by reference to IPC-TM-650 2.4.24.4 of greater than or equal to 210° C.

14. The article of claim 10, having a ratio of thermal expansion as measured by reference to IPC-TM-650 2.4.24.5 of less than or equal to 2.5%.

15. The article of claim 10, having a copper foil peeling strength as measured by reference to IPC-TM-650 2.4.8 of greater than or equal to 3.1 lb/in.

16. The article of claim 10, having a dissipation factor as measured by reference to JIS C2565 at 10 GHz of less than or equal to 0.0020.

17. The article of claim 10, characterized by passing a visual inspection test of laminate appearance.

18. A resin composition, comprising:
  100 parts by weight of a vinyl-containing polyphenylene ether resin;
  12 to 100 parts by weight of a compound of Formula (1); and
  0.01 to 4 parts by weight of a compound of Formula (4);
  wherein a ratio of part by weight of the compound of Formula (4) to the compound of Formula (1) is between $8.33 \times 10^{-5}$ and $8.33 \times 10^{-2}$;

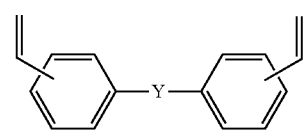

Formula (1)

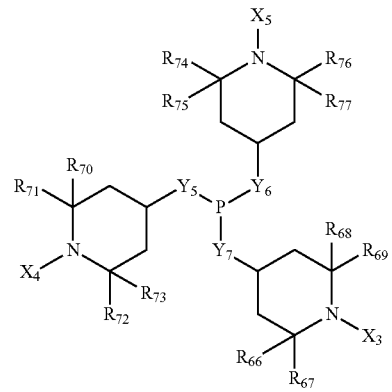

Formula (4)

wherein:
in Formula (1), Y is any one of Formula (1-1), Formula (1-2) and Formula (1-3) or a combination thereof:

$$-(CH_2)_{n1}-$$

Formula (1-1)

Formula (1-2)

Formula (1-3)

wherein n1 represents an integer of 0 to 30, n2 represents an integer of 0 to 6, and n3, n4, n5, n6 and n7 each individually represent an integer of 1 to 6;

in Formula (4), $Y_5$, $Y_6$ and $Y_7$ each independently represent a methylene group, an ether group, a secondary amino group, a carbonyl group or a phenylene group, $X_3$, $X_4$ and $X_5$ each independently represent an oxygen radical or a hydroxyl group, $R_{66}$ to $R_{77}$ each independently represent a hydrogen atom or a C1-$C_5$ alkyl group, and $R_{66}$ to $R_{77}$ are not a hydrogen atom at the same time;

wherein the vinyl-containing polyphenylene ether resin comprises a vinylbenzyl-containing polyphenylene ether resin, a methacrylate-containing polyphenylene ether resin, an allyl-containing polyphenylene ether resin, a vinylbenzyl-modified bisphenol A polyphenylene ether resin, a chain-extended vinyl-containing polyphenylene ether resin or a combination thereof;

wherein the compound of Formula (1) comprises its monomer, prepolymer, or a combination thereof; and wherein the compound of Formula (1) comprises a compound of any one of Formula (1-4) to Formula (1-6) or a combination thereof:

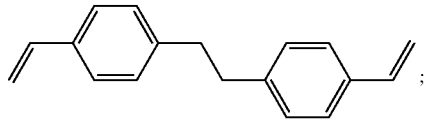

Formula (1-4)

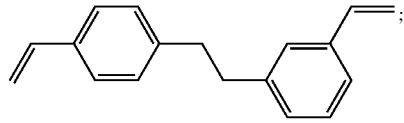

Formula (1-5)

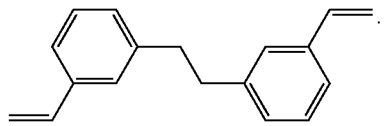

Formula (1-6)

\* \* \* \* \*